United States Patent
Gao et al.

(10) Patent No.: US 12,299,576 B2
(45) Date of Patent: May 13, 2025

(54) NEURAL NETWORK-BASED INFERENCE METHOD AND APPARATUS

(71) Applicants: Samsung Electronics Co., Ltd., Suwon-si (KR); UNIVERSITY OF ZURICH, Zurich (CH)

(72) Inventors: Chang Gao, Zurich (CH); Shih-Chii Liu, Zurich (CH); Tobi Delbruck, Zurich (CH); Xi Chen, Zurich (CH)

(73) Assignees: Samsung Electronics Co., Ltd., Suwon-si (KR); University of Zurich, Zurich (CH)

( * ) Notice: Subject to any disclaimer, the term of this patent is extended or adjusted under 35 U.S.C. 154(b) by 1009 days.

(21) Appl. No.: 17/343,001

(22) Filed: Jun. 9, 2021

(65) Prior Publication Data

US 2022/0261649 A1    Aug. 18, 2022

(30) Foreign Application Priority Data

Feb. 15, 2021 (KR) .................. 10-2021-0019755

(51) Int. Cl.
| | |
|---|---|
| *G06N 3/082* | (2023.01) |
| *G06F 9/50* | (2006.01) |
| *G06N 3/04* | (2023.01) |
| *G06N 5/04* | (2023.01) |
| *G06F 7/76* | (2006.01) |
| *G06N 3/063* | (2023.01) |

(52) U.S. Cl.
CPC .......... *G06N 3/082* (2013.01); *G06F 9/5083* (2013.01); *G06N 3/04* (2013.01); *G06N 5/04* (2013.01); *G06F 7/76* (2013.01); *G06N 3/063* (2013.01)

(58) Field of Classification Search
CPC ............ G06N 3/082; G06N 3/04; G06N 5/04; G06N 3/063; G06F 9/5083; G06F 7/76
See application file for complete search history.

(56) References Cited

U.S. PATENT DOCUMENTS

| | | | |
|---|---|---|---|
| 10,366,322 B2 * | 7/2019 | David | G06N 3/045 |
| 10,891,538 B2 * | 1/2021 | Dally | G06F 9/30036 |
| 10,936,947 B1 * | 3/2021 | Flunkert | G06N 3/044 |
| 12,056,614 B2 * | 8/2024 | Gorokhov | G06N 3/048 |
| 2018/0046914 A1 | 2/2018 | Li et al. | |
| 2018/0082181 A1 * | 3/2018 | Brothers | G06N 3/045 |
| 2019/0130271 A1 | 5/2019 | Narang et al. | |

(Continued)

FOREIGN PATENT DOCUMENTS

CN         110110851 A      8/2019

OTHER PUBLICATIONS

Dong, Peiyan, et al. "Rtmobile: Beyond Real-Time Mobile Acceleration of RNNs for Speech Recognition." *57th ACM/IEEE Design Automation Conference (DAC) IEEE*, 2020 (6 pages in English).

(Continued)

*Primary Examiner* — Corey S Faherty
(74) *Attorney, Agent, or Firm* — NSIP Law

(57) ABSTRACT

Disclosed is a neural network-based inference method and apparatus. The neural network-based inference method includes compressing a matrix comprising processing elements corresponding to an operation of a neural network, balancing workloads related to the operation by reordering the compressed matrix based on the workloads, and performing inference based on the reordered matrix.

15 Claims, 12 Drawing Sheets

(56) References Cited

U.S. PATENT DOCUMENTS

2019/0205746 A1 7/2019 Nurvitadhi et al.
2021/0125070 A1* 4/2021 Wang ..................... G06N 3/063

OTHER PUBLICATIONS

Shi, Runbin, et al. "Csb-rnn: A faster-than-realtime rnn acceleration framework with compressed structured blocks." *Proceedings of the 34th ACM International Conference on Supercomputing* arXiv:2005.05758v1 May 11, 2020 (12 pages in English).

Extended European Search Report issued on Feb. 22, 2022 in counterpart European Patent Application No. 21191444.5 (9 pages in English).

Han, Song, et al. "ESE: Efficient Speech Recognition Engine with Sparse LSTM on FPGA." *Proceedings of the 2017 ACM/SIGDA International Symposium on Field-Programmable Gate Arrays*, 2017 (pp. 1-10).

Cao, Shijie, et al. "Efficient and Effective Sparse LSTM on FPGA with Bank-Balanced Sparsity." *Proceedings of the 2019 ACM/SIGDA International Symposium on Field-Programmable Gate Arrays*, Feb. 24-26, 2019, (pp. 1-10).

Park, Junki, et al. "Balancing Computation Loads and Optimizing Input Vector Loading in LSTM Accelerators." *IEEE Transactions on Computer-Aided Design of Integrated Circuits and Systems*, 39, 9, 2019 (pp. 1889-1901).

* cited by examiner

NEURAL NETWORK-BASED INFERENCE METHOD AND APPARATUS

CROSS-REFERENCE TO RELATED APPLICATIONS

This application claims the benefit under 35 USC § 119(a) of Korean Patent Application No. 10-2021-0019755 filed on Feb. 15, 2021, in the Korean Intellectual Property Office, the entire disclosure of which is incorporated herein by reference for all purposes.

BACKGROUND

1. Field

The following description relates to a neural network-based inference method and apparatus.

2. Description of Related Art

A recurrent neural network (RNN) is a multi-layer network that has single or multiple fully connected memory states and includes complex neurons. The RNN has high accuracy in tasks including time-series sequences, such as automatic speech recognition and natural language processing.

Typical RNNs encounter the vanishing gradient problem in training. To overcome this issue, long short-term memory (LSTM) models were proposed. Since LSTM has high accuracy compared to general RNNs, many RNN hardware accelerators use LSTM to process sequential data. High computation costs are needed for LSTM models to achieve high accuracy. In inference using LSTM models, a large amount of time is used for matrix-vector multiplications.

Therefore, it is desirable to reduce the computation costs for matrix-vector multiplications to achieve efficient training and inference in neural networks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network-based inference method, including compressing a matrix comprising processing elements corresponding to an operation of a neural network, balancing workloads related to the operation by reordering the compressed matrix based on the workloads, and performing inference based on the reordered matrix.

The compressing may include generating subcolumns by splitting the matrix, and compressing the matrix by pruning elements of the subcolumns based on a target sparsity related to compression of the neural network.

The generating may include generating a first subcolumn corresponding to a first processing element of the matrix, and generating a second subcolumn corresponding to a second processing element of the matrix.

The compressing of the matrix by pruning elements of the subcolumns may include replacing the elements of the subcolumns with a predetermined value such that a ratio of elements other than the predetermined value in the elements of the subcolumns is the target sparsity.

The pruning of the elements of the subcolumns may include pruning the elements of the subcolumns by sequentially replacing the elements other than the predetermined value with the predetermined value, starting from an element having a smallest absolute value.

The balancing of the workloads related to the operation may include calculating the workloads corresponding to neurons of the neural network, assigning the workloads to the compressed matrix, and balancing the workloads by reordering the compressed matrix based on the workloads assigned to the compressed matrix.

The calculating of the workloads may include calculating the workloads by accumulating a numbers of elements other than the predetermined value in the neurons of the neural network.

The assigning may include assigning the workloads to columns of the compressed matrix.

The balancing may include comparing workloads corresponding to columns of the compressed matrix, and performing balancing by swapping the columns of the compressed matrix based on a result of the comparing.

The neural network-based inference method may include encoding the reordered matrix based on any one or any combination of components of the processing elements, positions of the processing elements, and a size of the reordered matrix.

In another general aspect, there is provided a neural network-based inference apparatus, including a processor configured to compress a matrix comprising processing elements corresponding to an operation of a neural network, to balance workloads related to the operation by reordering the compressed matrix based on the workloads, and to perform inference based on the reordered matrix.

The processor may be configured to generate subcolumns by splitting the matrix, and to compress the matrix by pruning elements of the subcolumns based on a target sparsity related to compression of the neural network.

The processor may be configured to generate a first subcolumn corresponding to a first processing element of the matrix, and to generate a second subcolumn corresponding to a second processing element of the matrix.

The processor may be configured to prune the elements of the subcolumns by replacing the elements of the subcolumns with a predetermined value such that a ratio of elements other than the predetermined value in the elements of the subcolumns is the target sparsity.

The processor may be configured to prune the elements of the subcolumns by sequentially replacing the elements other than the predetermined value with the predetermined value, starting from an element having a smallest absolute value.

The processor may be configured to calculate the workloads corresponding to neurons of the neural network, to assign the workloads to the compressed matrix, and to balance the workloads by reordering the compressed matrix based on the workloads assigned to the compressed matrix.

The processor may be configured to calculate the workloads by accumulating a numbers of elements other than the predetermined value in the neurons of the neural network.

The processor may be configured to assign the workloads to columns of the compressed matrix.

The processor may be configured to compare workloads corresponding to columns of the compressed matrix, and to perform balancing by swapping the columns of the compressed matrix based on a result of the comparing.

The processor may be configured to encode the reordered matrix based on any one or any combination of components of the processing elements, positions of the processing elements, and a size of the reordered matrix.

Other features and aspects will be apparent from the following detailed description, the drawings, and the claims.

Figure 1:
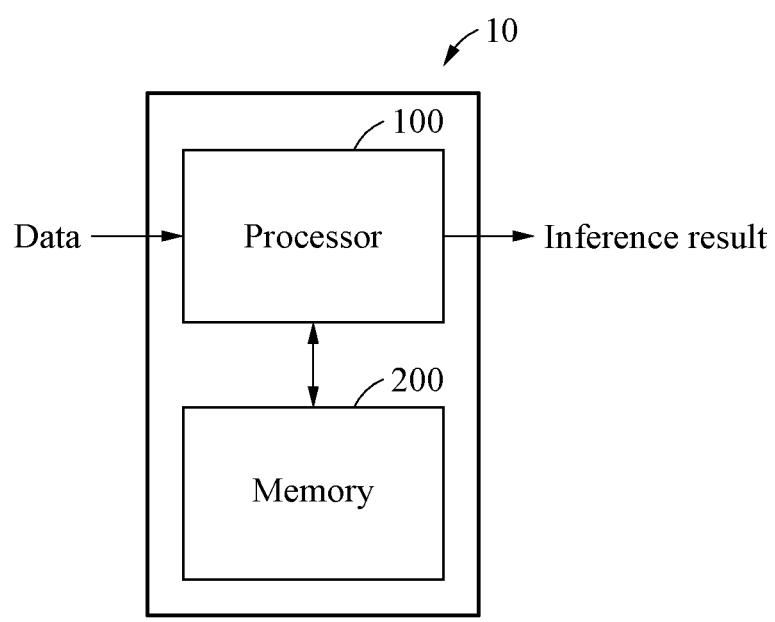
FIG. 1 illustrates an example of a neural network-based inference apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Although terms of first, second, A, B, (a), (b), may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 2:
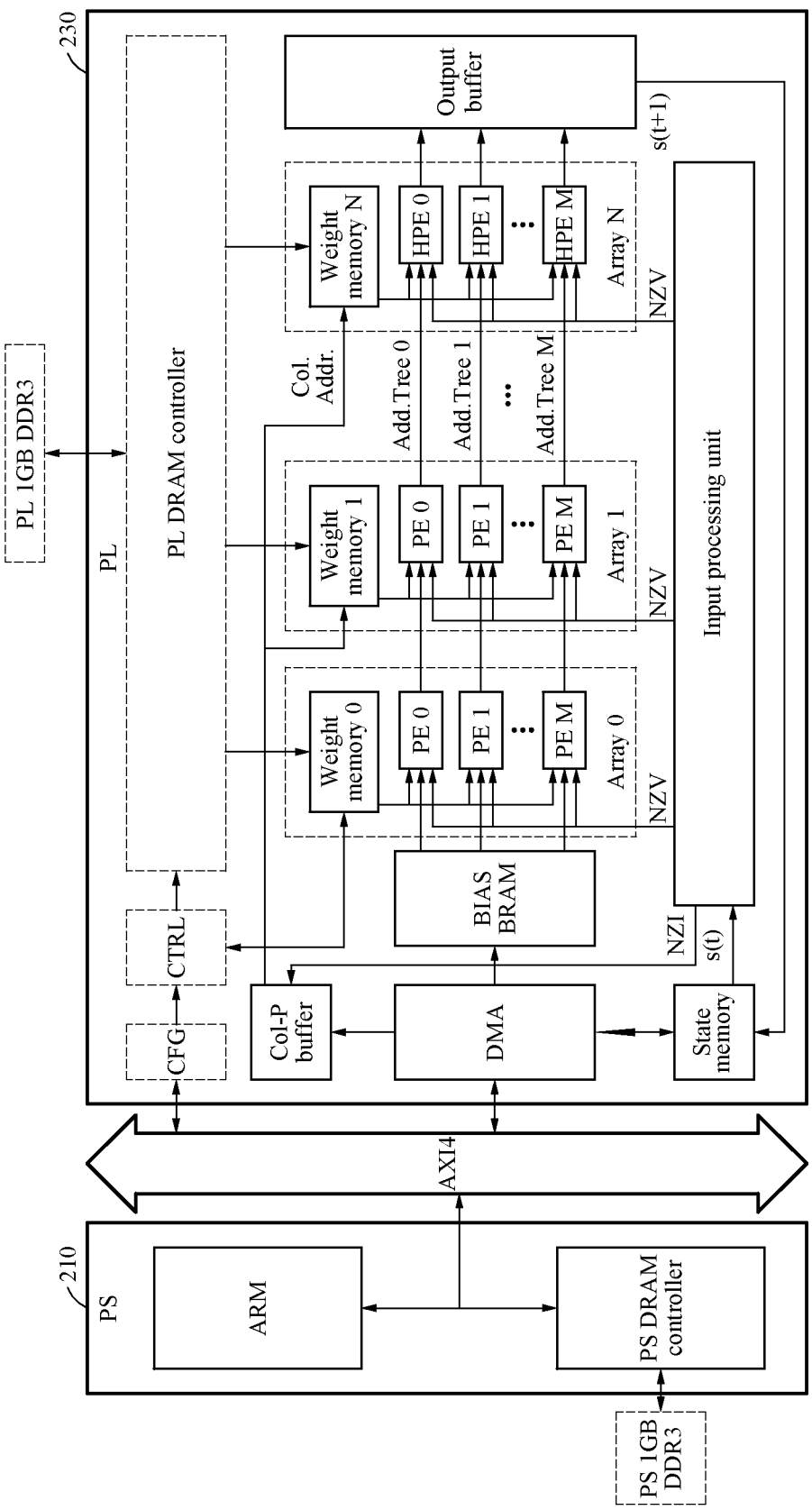
FIG. 2 illustrates an example of implementation of the neural network-based inference apparatus of FIG. 1.

FIG. 1 illustrates an example of a neural network-based inference apparatus, and FIG. 2 illustrates an example of implementation of the neural network-based inference apparatus of FIG. 1.

Referring to FIGS. 1 and 2, a neural network-based inference apparatus 10 may perform neural network-based inference. The neural network-based inference apparatus 10 may receive data, process the data using a neural network, and output an inference result.

The neural network or an artificial neural network (ANN) may generate mapping between input patterns and output patterns, and may have a generalization capability to generate a relatively correct output with respect to an input pattern that has not been used for training. The neural network may refer to a general model that has an ability to solve a problem, where nodes form the network through synaptic combinations change a connection strength of synapses through training.

The neural network may be a model with a machine learning structure designed to extract feature data from input data and provide an inference operation based on the feature data. The feature data may be data associated with a feature obtained by abstracting input data. If input data is an image, feature data may be data obtained by abstracting the image and may be represented in a form of, for example, a vector.

The neural network may include a deep neural network (DNN) including a plurality of layers and may be simply referred to as a neural network. The plurality of layers may include an input layer, hidden layers, and an output layer. The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). In an example, at least a portion of the plurality of layers in the neural network may correspond to the CNN, and another portion thereof may correspond to the FCN. In this case, the CNN may be referred to as convolutional layers, and the FCN may be referred to as fully connected layers.

The neural network-based inference apparatus 10 may balance imbalanced workloads of the neural network, thereby increasing throughput and lowering latency.

A workload may refer to the number of tasks that are assigned to be performed within a given time. For example, the workload may include an amount of operation that needs to be performed.

The neural network-based inference apparatus 10 may reduce the amount of operation of the neural network by pruning a matrix including processing elements.

The neural network-based inference apparatus 10 may balance imbalanced workloads of operation devices that perform an operation included in the neural network. Balancing may refer to evenly distributing workloads to prevent overloading a processor in a multi-processing system.

The neural network-based inference apparatus 10 includes a processor 100 and a memory 200.

As shown in FIG. 2, the processor 100 may include a processing system (PS) 210 and a programmable logic (PL) 230. The PS 210 may include an advanced reduced instruction set computing (RISC) machine (ARM) and a PS dynamic random-access memory (DRAM) controller.

The PL 230 may include a control flow graph (CFG), a controller CTRL, a PL DRAM controller, a Col-P buffer, a direct memory access (DMA), a BIAS block random-access memory (BIAS BRAM), weight memories, processing elements (PEs), an output buffer, a state memory, a state memory, and an input processing unit.

The processor 100 may process data stored in the memory 200. The processor 100 may execute a computer-readable code (for example, software) stored in the memory 200 and instructions triggered by the processor 100.

The "processor 100" may be a data processing device implemented by hardware including a circuit having a physical structure to perform desired operations. For example, the desired operations may include code or instructions included in a program.

For example, the hardware-implemented data processing device may include, for example, a microprocessor, a central processing unit (CPU), a processor core, a multi-core processor, single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a programmable logic unit (PLU), a central processing unit (CPU), a graphics processing unit (GPU), a neural processing unit (NPU), a multiprocessor, an application-specific integrated circuit (ASIC), and a field-programmable gate array (FPGA), or any other device capable of responding to and executing instructions in a defined manner.

The processor 100 may compress a matrix including processing elements corresponding to an operation of a neural network.

The connection relationship between neurons of the neural network that is used by the neural network-based inference apparatus 10 for inference may correspond to the matrix including the processing elements. The processing elements may correspond to the neurons, units, or artificial nodes of the neural network.

The neurons of the neural network that is used by the neural network-based inference apparatus 10 for inference may include vectors.

The processing elements may include at least one operation. For example, the processing elements may include at least one multiply-accumulator (MAC).

The processor 100 may generate subcolumns by splitting the matrix including the processing elements. A subcolumn may be a column including only a portion of elements of the matrix including the processing elements.

In an example, the processor 100 may generate a first subcolumn corresponding to a first processing element of the matrix including the processing elements, and generate a second subcolumn corresponding to a second processing element of the matrix including the processing elements.

The processor 100 may compress the matrix including the processing elements by pruning the elements of the subcolumns based on a target sparsity related to compression of the neural network.

Pruning may include compression to reduce the size of the neural network. Pruning may also include simplifying the processing process of the neural network. For example, pruning may include removing processing elements, removing elements used for an operation corresponding to the processing elements, or removing the operation.

The sparsity may be a ratio of invalid processing elements among all the processing elements (or weights) of the neural network. The invalid processing elements or weights may have a value. That is, the sparsity may be a ratio of the value of the invalid processing elements or weights among the weight values of the neural network.

For example, the sparsity may a ratio of "0"s among the weight values of the neural network. If the sparsity is high, the number of valid weights may be small, and the demand for operations and storage may decrease. Conversely, if the sparsity is low, the number of valid weights may be large, and the demand for operations and storage may increase.

The processor 100 may prune the elements of the subcolumns by replacing the elements of the subcolumns with a predetermined value such that a ratio of elements other than the predetermined value in the elements of the subcolumns is the target sparsity.

The target sparsity may be a desired sparsity of the neural network that is desired to be achieved by the processor 100. The target sparsity may be determined based on the performance of the neural network, such as accuracy or phone error rate (PER).

In an example, the processor 100 may prune the elements of the subcolumns by sequentially replacing the elements other than the predetermined value with the predetermined value, starting from an element whose absolute value is small. For example, the predetermined value may be "0".

The processor 100 may balance workloads related to the operation of the neural network by reordering the compressed matrix based on the workloads. The processor 100 may perform balancing to generate a reordered matrix.

The processor 100 may calculate workloads corresponding to neurons of the neural network. The processor 100 may calculate the workloads by accumulating the numbers of elements other than the predetermined value in the neurons of the neural network.

The processor 100 may assign the workloads corresponding to the neurons to the compressed matrix. The processor 100 may assign the workloads to columns of the compressed matrix.

The processor 100 may balance the workloads by reordering the compressed matrix based on the workloads assigned to the compressed matrix. The processor 100 may compare the workloads corresponding to the columns of the compressed matrix.

The processor 100 may perform balancing by swapping the columns of the matrix based on a result of the comparing.

In an example, the processor 100 may encode the reordered matrix based on components of the processing elements, positions of the processing elements, and a size of the reordered matrix. The size of the reordered matrix may include the length of a row or column of the matrix.

In an example, the processor 100 may train the neural network. In an example, the processor 100 may simultaneously compress and train the neural network.

The memory 200 may store instructions (or programs) executable by the processor 100. For example, the instructions include instructions to perform an operation of the processor 100 and/or an operation of each element of the processor 100.

The memory 200 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Hereinafter, the process of compressing and encoding the matrix including the processing elements by the neural network-based inference apparatus will be described with reference to FIG. 3.

Figure 3:
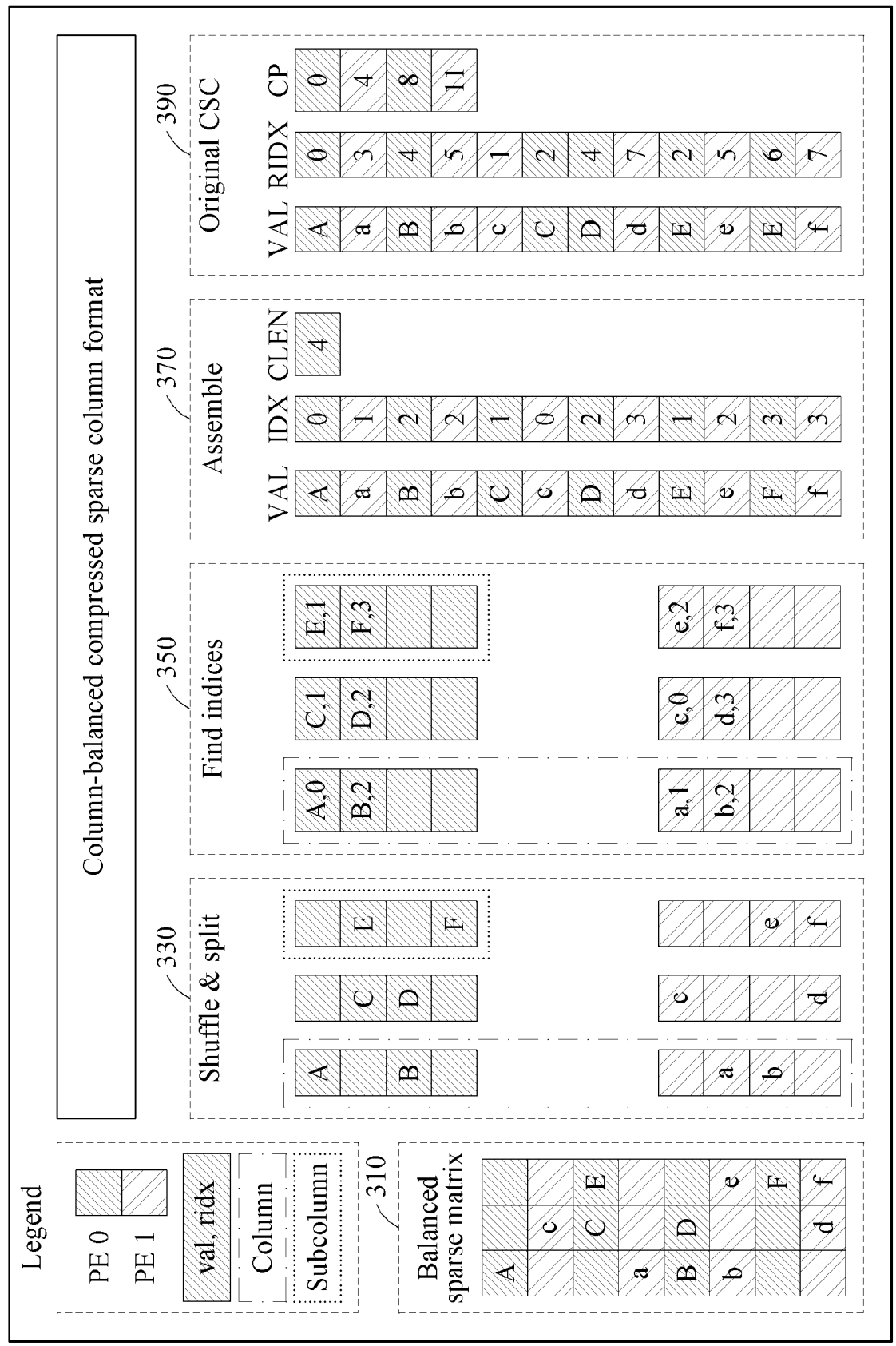
FIG. 3 illustrates an example of an operation of the neural network-based inference apparatus of FIG. 1.

FIG. 3 illustrates an example of an operation of the neural network-based inference apparatus of FIG. 1.

Referring to FIG. 3, the processor 100 may use a fixed number of MAC units for the column direction of a matrix including processing elements. The example of FIG. 3 illustrates an example where two processing units are present.

A matrix 310 including the processing elements may have weights corresponding to the processing elements as elements or entries of the matrix.

In operation 330, the processor 100 may generate subcolumns by splitting the matrix 310 including the processing elements. In an example, the processor 100 may split a column of the matrix 310 including the processing elements into subcolumns based on the number of MACs.

The processor 100 may sort weight elements of each subcolumn according to the magnitude, and perform pruning on the subcolumn using a target sparsity. The processor 100 may perform pruning on each subcolumn, starting from the smallest element.

The processor 100 may perform pruning on each subcolumn to equalize the numbers of elements other than a predetermined value in the matrix 310 including the components. That is, the processor 100 may balance workloads for weights. For example, the predetermined value may be "0".

In an example, the processor 100 may perform encoding. In an example, in operation 350, the processor 100 may search for positions (for example, indices) of elements that remain after the pruning in the pruned matrix and record the found positions in the remaining elements.

In operation 370, the processor 100 may assemble information on values of the remaining elements, the indices, and the size of the matrix in a column-balanced compressed sparse column format. For example, the processor 100 may generate a vector including the values of the elements remaining after the pruning, generate a vector including the indices of the remaining elements, and store the length of the columns. In this example, the length of the columns may be a scalar value.

An original compressed sparse column (CSC) 390 may be expressed in a format of elements (VAL) other than the predetermined value, row indices (RINX), and column pointers (CP).

Hereinafter, the process of compressing a matrix including processing elements will be described with reference to FIGS. 4 to 9.

Figure 4:
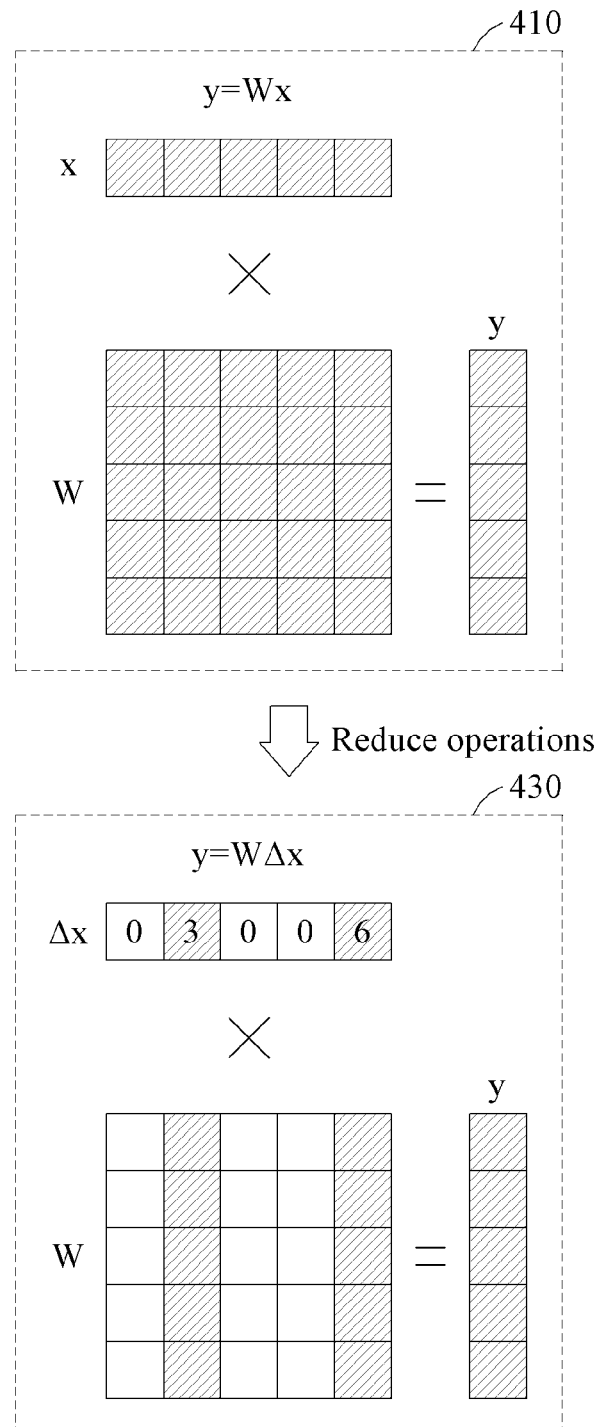
FIG. 4 illustrates an example of reducing an amount of operation of a neural network.

FIG. 4 illustrates an example of reducing an amount of operation of a neural network.

Referring to FIG. 4, the processor 100 may reduce an amount of operation of a neural network. The processor 100 may reduce the amount of operation using a sparsity of the neural network.

When performing an operation of a neural network 410, the processor 100 may reduce an amount of operation by pruning elements having a predetermined value from the operation. For example, the predetermined value may include "0".

The processor 100 may generate a compressed neural network 430 by compressing the neural network 410. In the example of FIG. 4, the processor 100 may greatly reduce the amount of operation using the compressed neural network 430.

Hereinafter, the process of compressing a matrix including processing elements by the processor 100 will be described with reference to FIGS. 5 to 7.

Figure 5:
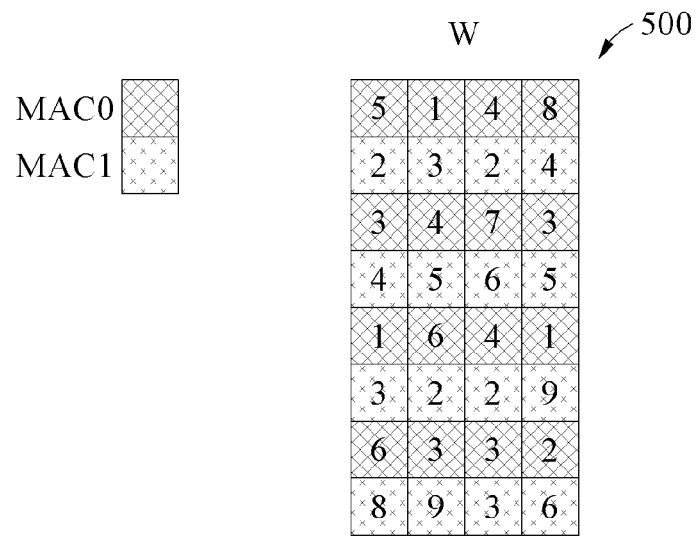
FIG. 5 illustrates an example of a matrix including processing elements.
Figure 6:
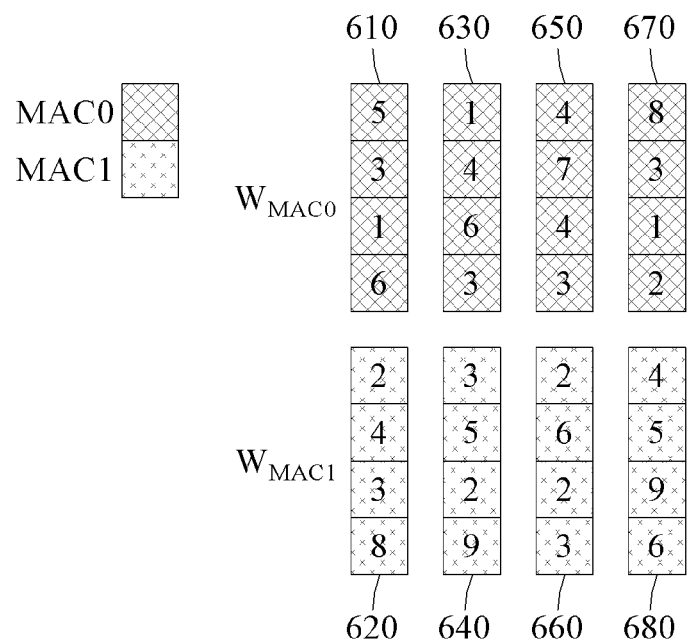
FIG. 6 illustrates an example of subcolumns generated from the matrix of FIG. 5.
Figure 7:
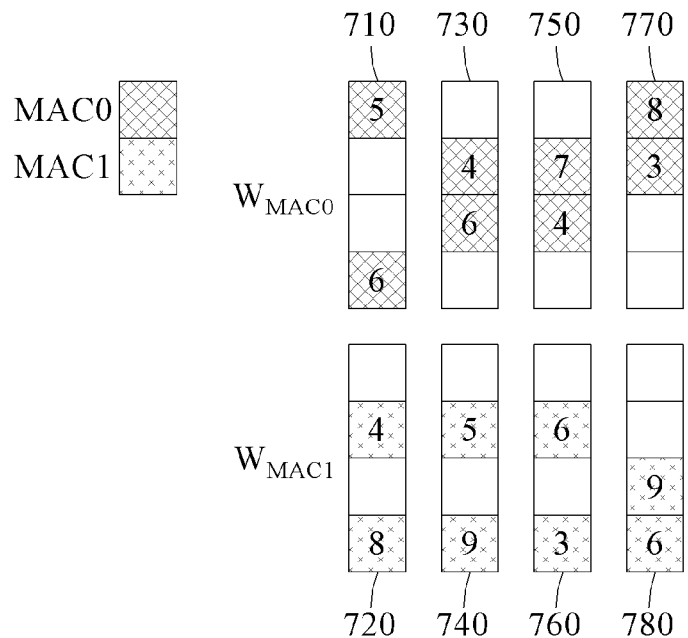
FIG. 7 illustrates an example of a result of pruning the subcolumns of FIG. 6.

FIG. 5 illustrates an example of a matrix including processing elements, FIG. 6 illustrates an example of subcolumns generated from the matrix of FIG. 5, and FIG. 7 illustrates an example of a result of pruning the subcolumns of FIG. 6.

Referring to FIGS. 5 to 7, the processor 100 may compress a neural network. The processor 100 may update a matrix 500 including processing elements using a predetermined training data set. The processor 100 may update the neural network through iteration.

Figure 8:
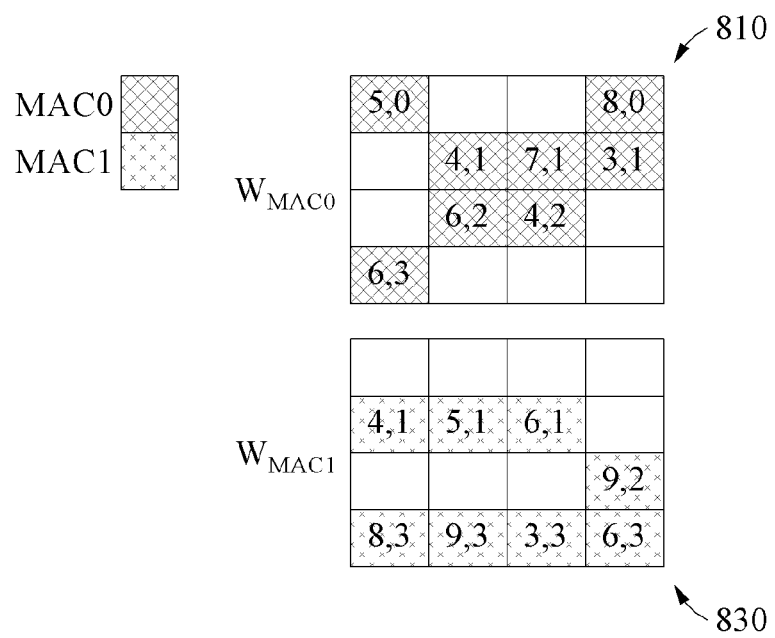
FIG. 8 illustrates an example of encoding a pruned matrix by the neural network-based inference apparatus of FIG. 1.

In the examples of FIGS. 5 to 7, the processing elements may include a MAC operation. FIG. 8 illustrates an example where there are two processing elements. Depending on the configuration of a neural network, three or more processing elements may be provided.

In the example of FIG. 5, the processor 100 may generate a matrix 500 including processing elements (hereinafter, referred to as the matrix 500). The processor 100 may generate the matrix 500 by alternately assigning rows of weights corresponding to a first processing element (for example, MAC0) and rows of weights corresponding to a second processing element (for example, MAC1).

The processor 100 may generate subcolumns by splitting the matrix 500. The processor 100 may generate the subcolumns by extracting elements from the matrix 500 at first intervals and arranging the extracted elements in the form of columns.

In the example of FIG. 6, the processor 100 may generate a first subcolumn 610 by extracting the weights corresponding to the first processing element of the matrix 500 at the first intervals. In an example, the processor 100 may generate the first subcolumn 610 by extracting weights 5, 3, 1, and 6 corresponding to the first processing element at the first intervals.

In this example, the first intervals may be determined based on the dimension of two-dimensional (2D) MAC arrays. For example, the elements of the matrix 500 may be extracted at intervals of the columnwise dimension of the 2D MAC arrays. That is, in the example of FIG. 6, the first intervals may be "4". The first intervals for the elements are not limited to "4" and may differ depending on the dimension of the 2D MAC arrays.

Likewise, the processor 100 may generate a second subcolumn 620 by extracting the weights corresponding to the second processing element of the matrix 500 at the first intervals. In detail, the processor 100 may generate the second subcolumn 620 by extracting weights 2, 4, 3, and 8 corresponding to the second processing element.

In the same manner, as shown in FIG. 6, the processor 100 may generate a third subcolumn 630, a fourth subcolumn 640, a fifth subcolumn 650, a sixth subcolumn 660, a seventh subcolumn 670, and an eighth subcolumn 680.

The processor 100 may compress the matrix 500 by pruning elements of the generated subcolumns 610 to 680 based on a target sparsity. The example of FIG. 7 shows a case where the target sparsity is 50%. However, the target sparsity may be set differently according to the number of processing elements, the accuracy, and a training data set.

The processor 100 may generate pruned subcolumns 710 to 780 by replacing the elements of the subcolumns with a predetermined value such that a ratio of elements other than the predetermined value in the elements of the subcolumns 610 to 680 is the target sparsity.

The processor 100 may prune the elements of the subcolumns by sequentially replacing the elements other than the predetermined value with the predetermined value, starting from an element whose absolute value is small. For example, the predetermined value may be "0". That is, the processor 100 may perform pruning by replacing elements whose absolute values are small with "0".

In the example of FIG. 7, the processor 100 may generate the subcolumn 710 by removing two elements from the subcolumn 610 in ascending order of the absolute values. That is, the processor 100 may generate the subcolumn 710 by removing 3 and 1 from the subcolumn 610.

Likewise, the processor 100 may generate the subcolumns 720 to 780 by removing elements whose absolute values are small from the subcolumns 620 to 680.

In an example, the processor 100 may compress the matrix 500 by performing pruning based on a drop rate. The drop rate may be initialized to "0" and increased by "1" for each iteration. After all iterations, the processor 100 may achieve the target sparsity of the matrix 500.

An example of an encoding operation will be described with reference to FIGS. 8 and 9.

Figure 9:
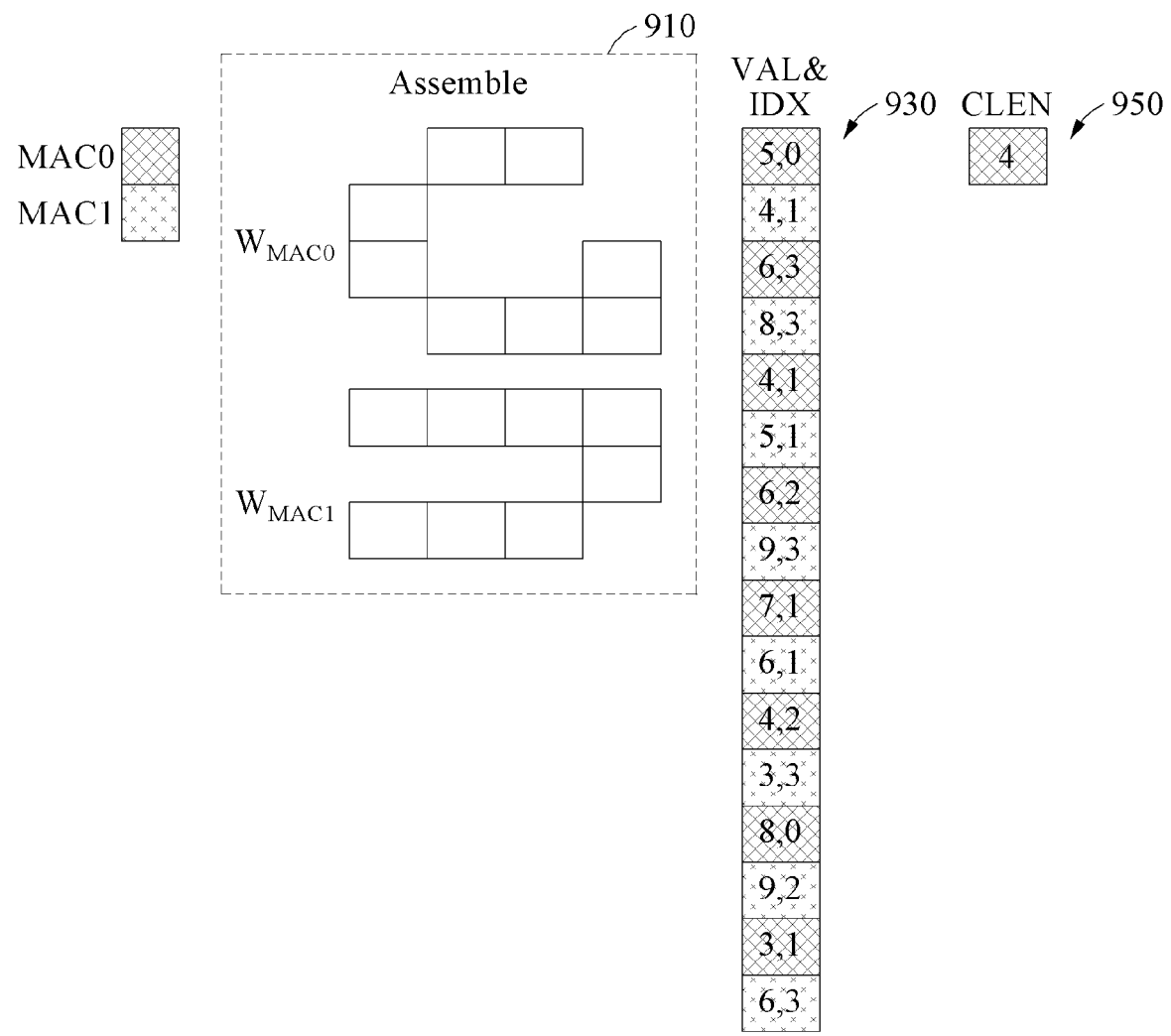
FIG. 9 illustrates an example of a result of encoding in a column-balanced compressed sparse column format.

FIG. 8 illustrates an example of encoding a pruned matrix by the neural network-based inference apparatus of FIG. 1, and FIG. 9 illustrates an example of a result of encoding in a column-balanced compressed sparse column format.

Referring to FIGS. 8 and 9, the processor 100 may encode the matrix 500 (or reordered matrix) based on components of the processing elements, positions of the processing elements, and a size of the matrix 500 on which pruning is performed.

The components of the processing elements may be the elements of the subcolumns 710 to 780 described above. The positions of the processing elements may be indices of the elements of the subcolumns 710 to 780 in the matrix 500.

First, the processor 100 may obtain the positions of the elements of the subcolumns 710 to 780 after pruning is performed.

For example, the processor 100 may obtain column indices of the remaining elements 5 and 6 in the subcolumn 710. In detail, the processor 100 may indicate the element 5 and a column index "0" of the element 5 together in the matrix 810, and indicate the element 6 and a column index "3" of the element 6 together in the matrix 810.

Likewise, the processor 100 may indicate position information of the remaining elements of the subcolumns 730, 750, and 770 in the matrix 810. Further, the processor 100 may indicate position information of the remaining elements of the subcolumns 720, 740, 760, and 780 in a matrix 830.

The processor 100 may assemble the matrix 810 and the matrix 830 in a column-balanced compressed sparse column format (CBCSC) format based on the matrices 810 and 830 indicating the position information.

FIG. 9 shows an example of a sparse matrix assembled in a CBCSC format. A matrix 910 shows weights including invalid elements, and a vector 930 may indicate valid elements and position information thereof. A scalar 950 may indicate the column length of 2D MAC arrays.

Hereinafter, the process of balancing workloads by the processor 100 will be described with reference to FIGS. 10 to 15.

Figure 10:
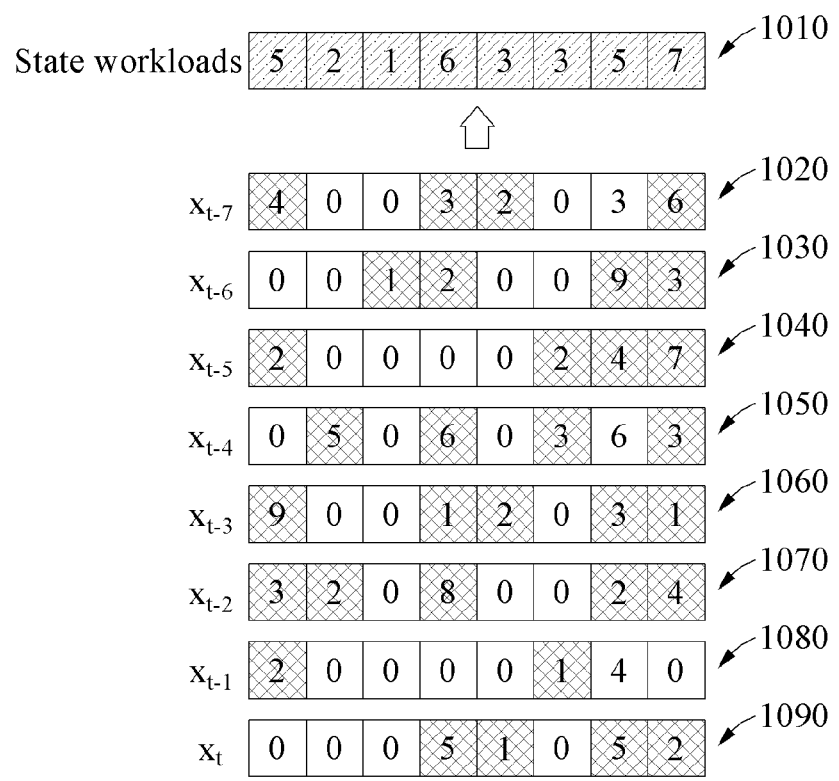
FIG. 10 illustrates an example of calculating workloads of a neural network by the neural network-based inference apparatus of FIG. 1.

FIG. 10 illustrates an example of calculating workloads of a neural network by the neural network-based inference apparatus of FIG. 1.

Referring to FIG. 10, the processor 100 may calculate workloads corresponding to neurons of a neural network. The neuron of the neural network may include at least one vector.

The example of FIG. 10 shows the process of calculating workloads based on a neural network including eight vectors 1020 to 1090. The processor 100 may calculate workloads corresponding to neurons represented by the vectors 1020 to 1090. The processor 100 may calculate workloads of neurons of the neural network that uses a training data set.

State workloads 1010 may be the workloads calculated by the processor 100. The processor 100 may calculate the workloads by accumulating elements other than a predetermined value at the same positions of the vectors 1020 to 1090.

For example, the processor 100 may calculate a first workload by accumulating the non-zero values among the first elements of the vectors 1020 to 1090. Since the number of non-zero vectors among the first elements of the vectors 1020 to 1090 is "5", the first value of the state workloads 1010 may be calculated as "5".

Likewise, the processor 100 may calculate the second to eighth values of the state workloads 1010 by accumulating the number of non-zero elements at the corresponding positions of the vectors 1020 to 1090.

Through the above-described process, the processor 100 may calculate the workloads of the neural network. The calculated workloads may be represented like the state workloads 1010.

Hereinafter, the process of balancing the workloads by reordering a compressed matrix will be described with reference to FIGS. 11 to 15.

Figure 11:
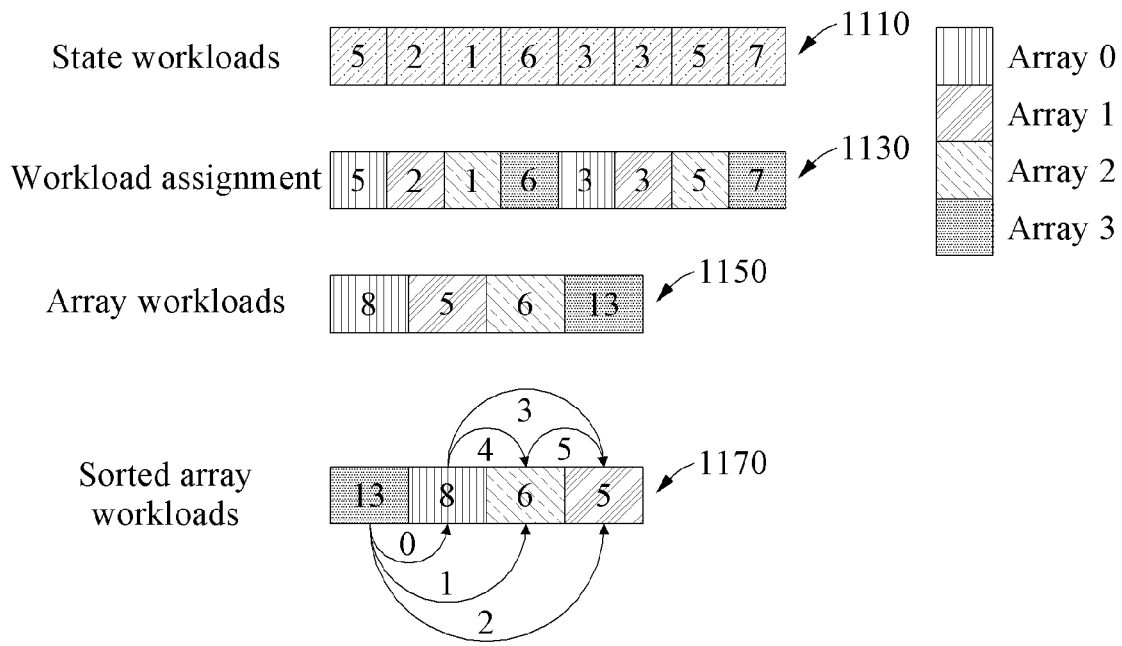
FIG. 11 illustrates an example of balancing workloads by the neural network-based inference apparatus of FIG. 1.
Figure 12:
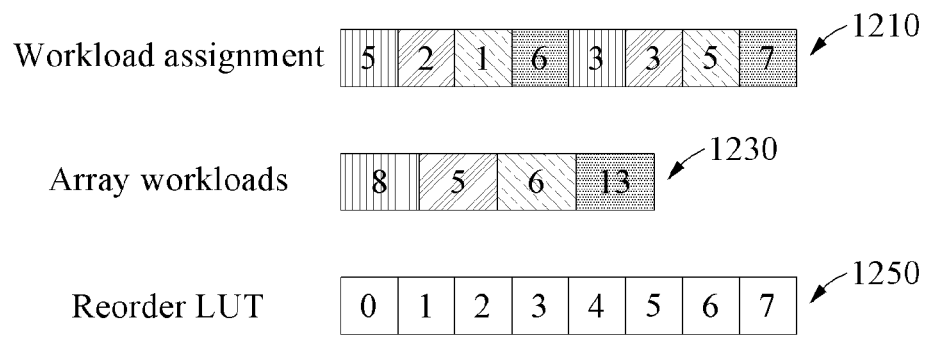
FIG. 12 illustrates an example of workload assignment, array workloads, and a reorder look-up table (LUT).

FIG. 11 illustrates an example of balancing workloads by the neural network-based inference apparatus of FIG. 1, and FIG. 12 illustrates an example of workload assignment, array workloads, and a reorder look-up table (LUT).

Referring to FIGS. 11 and 12, the processor 100 may calculate workloads of a neural network. The processor 100 may calculate workload imbalance of the neural network from the workloads of the neural network.

The processor 100 may calculate a workload mean (p') for one layer, as expressed by Equation 1.

$$\mu^l = \frac{1}{N_{Array}} \sum_{i=0}^{N_{Array}} wl_i^l \qquad \text{[Equation 1]}$$

In Equation 1, l denotes an index of a layer, and $N_{Array}$ denotes the number of arrays. $wl_i^l$ denotes each workload value, and i denotes an index of an array. An array may be an array of processing elements. For example, the array may be a MAC array.

The processor 100 may calculate the imbalance $imb_i^l$, in each array, as expressed by Equation 2.

$$imb_i^l = \frac{wl_i^l - \mu^l}{\mu^l} \qquad \text{[Equation 2]}$$

The processor 100 may calculate, as expressed by Equation 3, imbalance $IMB^l$ of a layer using the array imbalance, calculated using Equation 2.

$$IMB^l = \max_i(imb_i^l) \qquad \text{[Equation 3]}$$

The processor 100 may calculate, as expressed by Equation 4, weighted imbalance of the neural network using the layer imbalance, calculated using Equation 3.

$$WIMB = \frac{1}{N_\theta} \sum_{l=0}^{N_{layer}} imb^l \cdot n_\theta^l \qquad \text{[Equation 4]}$$

In Equation 4, $N_{layer}$ denotes the number of layers, $N_\theta$ denotes the number of parameters of the neural network, and $n_\theta^l$ denotes the number of parameters of a layer l.

The processor 100 may assign the calculated workloads to a compressed matrix. The processor 100 may assign the calculated workloads to the 2D MAC arrays.

The processor 100 may extract elements (or workload elements) of state workloads 1110 at second intervals and assign the extracted elements to array workloads 1150. In this example, the second intervals may be determined based on the size of the 2D MAC arrays. The processor 100 may determine the second intervals to be a row dimension of the 2D MAC arrays.

Although a case where the second intervals are "4" is described in the example of FIG. 11, the second intervals may be less than or greater than "4" according to examples.

For example, the processor 100 may assign a first element "5" of the state workloads 1110 to a first array (array 0), among the 2D MAC arrays, and assign a second element "2" of the state workloads 110 to a second array (array 1).

Likewise, the processor 100 may assign third and fourth workload elements of the state workloads 1110 to a third array (array 2) and a fourth array (array 3), respectively. The processor 100 may assign a fifth workload element "3" to the first array (array 0) and assign a sixth workload element "3" to the second array (array 1). The other workload elements may also be assigned in the manner described above and thereby represented as like state workloads 1130 matched with the arrays.

The processor 100 may generate array workloads 1150 by adding workloads, corresponding to each array, of the state workloads 1130. That is, the array workloads 1150 may have four workload elements. The workload elements may correspond to respective MAC arrays.

In the array workloads 1150, the workloads assigned to the respective MAC arrays may differ from each other. The processor 100 may balance the different workloads, to prevent a bottleneck from occurring in columns of any single MAC array.

In an example, the processor 100 may balance the workloads by reordering a matrix including compressed processing elements (or a matrix including non-compressed processing elements) based on the assigned workloads.

In an example, the processor 100 may balance the workloads through iteration. The iteration may include an outer loop and an inner loop. The processor 100 may compare two workload elements of the array workloads in the outer loop. In this example, there may be included two workloads, a source array workload and a target array workload.

In an example, the processor 100 may compare the source array workload to a mean value of the workloads. In another example, the processor 100 may compare the target array workload to the mean value of the workloads. The processor 100 may continue to perform the outer loop (for example, without swapping neurons) if the source array workload is less than or equal to the mean value of the workloads or if the target array workload is greater than or equal to the mean value of the workloads.

The mean of the workloads may be the mean of the workloads of the array workloads 1150. In the example of FIG. 11, the mean of the workloads "8", "5", "6", and "13" may be "8".

The processor 100 may determine an iteration count of the outer loop based on a combination of the workloads of the generated array workloads 1150. For example, if the number of elements of the array workloads 1150 is "4", a total of six iterations may be performed, as shown in FIG. 11, to compare the four elements to each other.

The operation performed in the outer loop may be expressed by pseudocode as follows.

```
For i =0 to (P-1) do:
If wl_source_array <= wl_mean or wl_target_array >= wl_mean:
continue;
```

Here, wl_source_array denotes the source array workload, wl_mean denotes the mean of the workloads, and wl_target_array denotes the target array workload. P denotes the number of pairs of a source array workload and a target array workload. In the example of FIG. 11, P may be "6".

Referring to the example of FIG. 12, the processor 100 may generate state workloads 1210 in which workloads are assigned to MAC array columns, and generate array workloads 1230 by adding the workloads.

The processor 100 may generate sorted array workloads 1170 by reordering the MAC array columns corresponding to the workloads based on the workload elements of the array workloads 1230. In an example, the processor 100 may reorder the array workloads 1230 using a reorder LUT.

Hereinafter, the process of reordering a matrix including processing elements based on workloads will be described in detail with reference to FIGS. 13 to 15.

Figure 13:
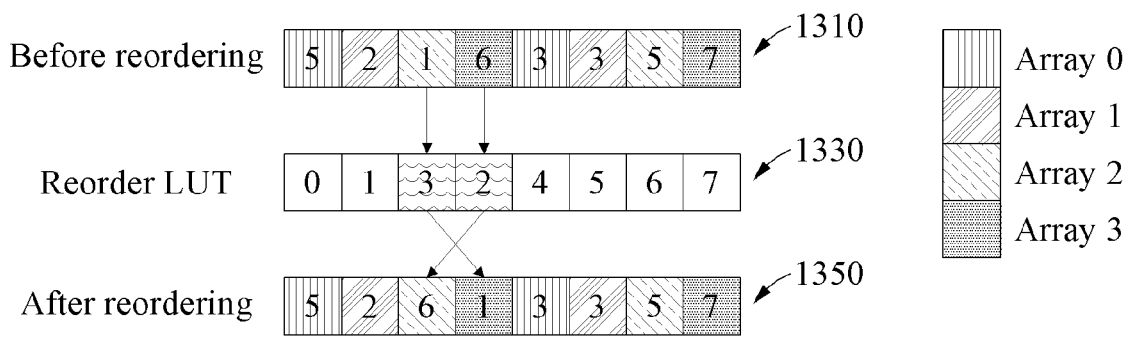
FIG. 13 illustrates an example of reordering a matrix using a reorder LUT by the neural network-based inference apparatus of FIG. 1.
Figure 14:
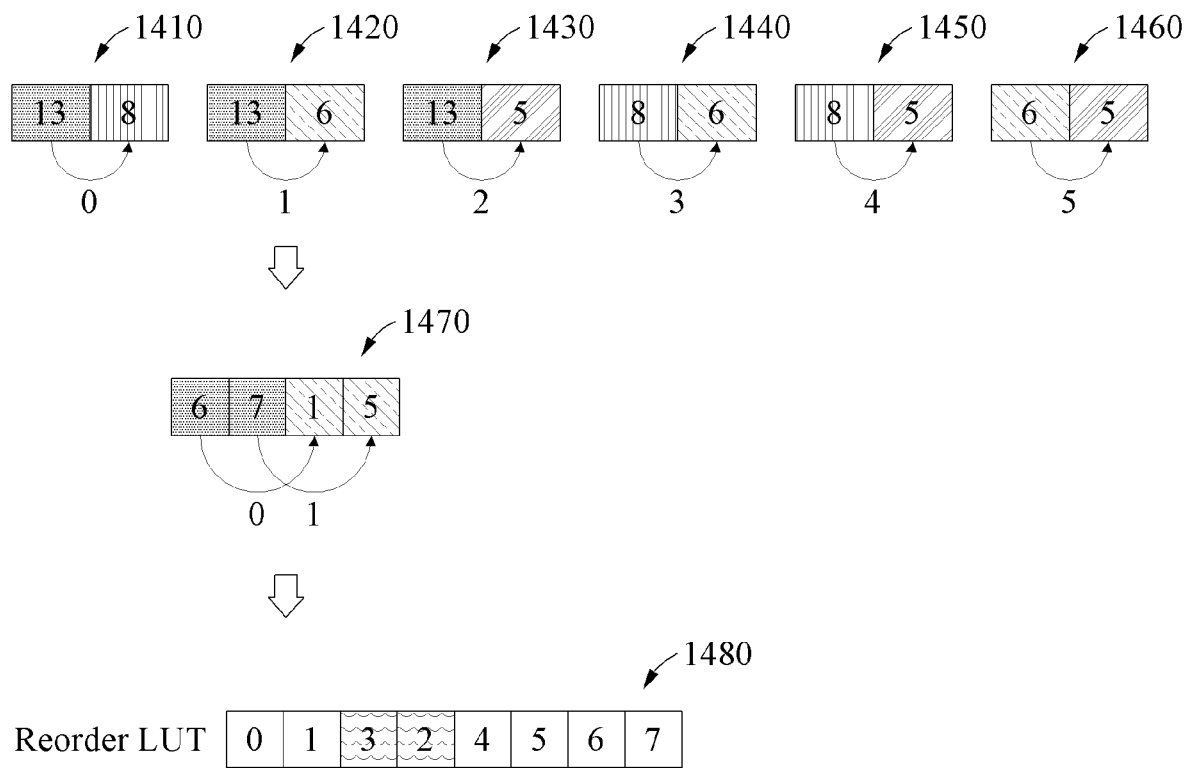
FIG. 14 illustrates an example of swapping columns by comparing workloads by the neural network-based inference apparatus of FIG. 1.
Figure 15:
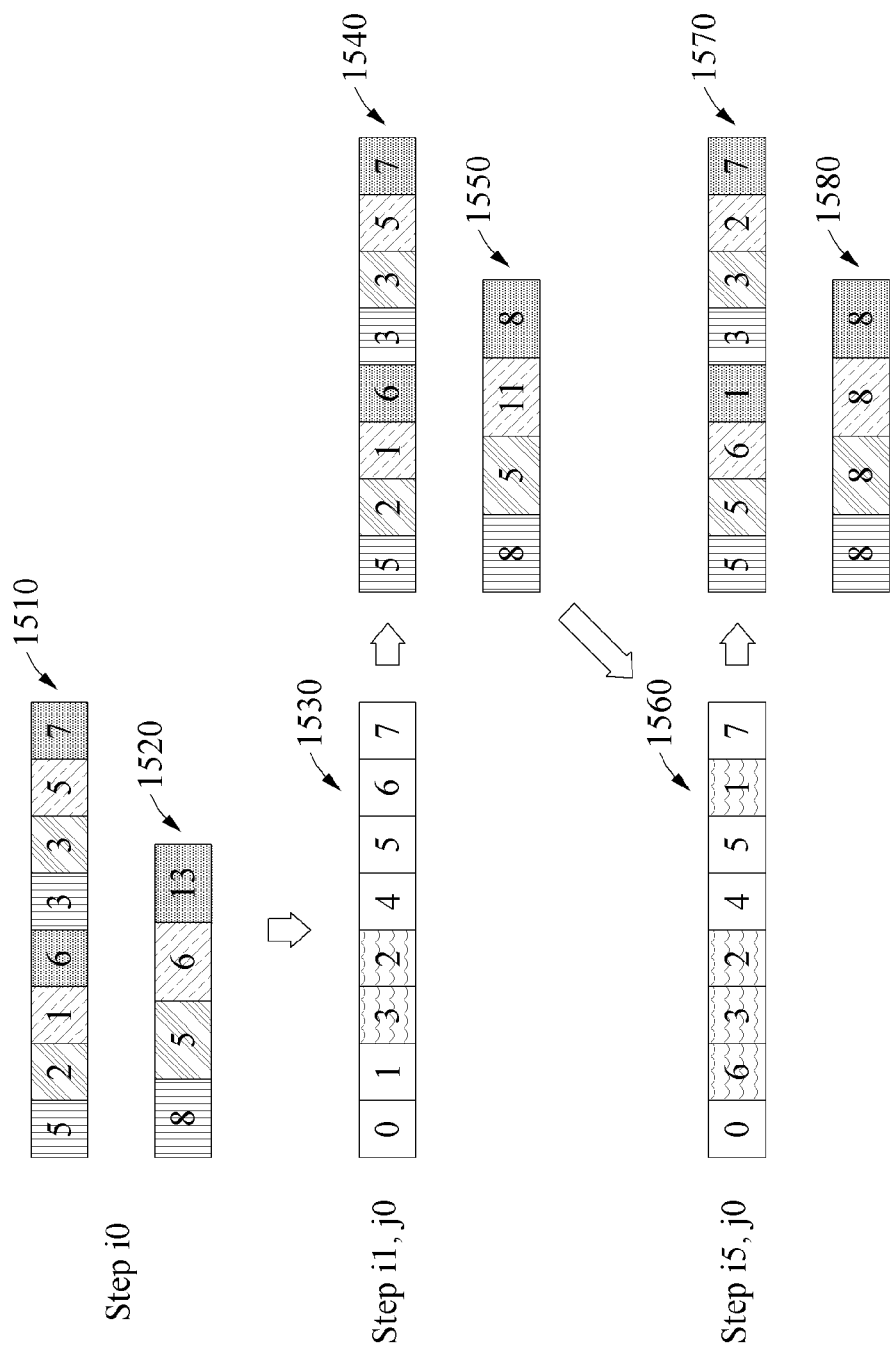
FIG. 15 illustrates an example of balancing workloads by reordering a matrix by the neural network-based inference apparatus of FIG. 1.

FIG. 13 illustrates an example of reordering a matrix using a reorder LUT by the neural network-based inference apparatus of FIG. 1, FIG. 14 illustrates an example of swapping columns by comparing workloads by the neural network-based inference apparatus of FIG. 1, and FIG. 15 illustrates an example of balancing workloads by reordering a matrix by the neural network-based inference apparatus of FIG. 1.

Referring to FIGS. 13 to 15, the processor 100 may obtain after-reordering state workloads 1350 by reordering before-reordering state workloads 1310 using a reordering LUT 1330.

The processor 100 may perform balancing by comparing workloads corresponding to columns of a matrix including processing elements (or a matrix including compressed processing elements) and swapping the columns of the matrix based on a result of the comparing.

The processor 100 may first compare all pairs 1410 to 1460 of workloads of the before-reordering state workloads 1310. The processor 100 may swap neurons if a result of the comparing shows a source neuron workload is greater than a target neuron workload.

Here, the neurons may correspond to the columns of the matrix including the processing elements (or the matrix including the compressed processing elements). That is, swapping the neurons may refer to swapping the columns of the compressed matrix.

In an example, the processor 100 may perform the swapping operation through iteration statements. For example, the processor 100 may iteratively perform balancing through the following pseudocode.

```
for j=0 to (Q-1) do:
if wl_source_array <= wl_mean or wl_target_array >= wl_mean:
break;
elif wl_source_neuron > wl_target_neuron:
Swap neuron;
else:
continue;
```

Here, Q denotes the number of neurons assigned to each array, wl_source_neuron denotes the source neuron workload, and wl_target_neuron denotes the target neuron workload.

In an example, the processor 100 may break the inner loop if the source array workload is less than or equal to the mean of the workloads or the target array workload is greater than or equal to the mean of the workloads.

The processor 100 may swap the neurons if the source neuron workload is greater than the target neuron workload.

In the example of FIG. 14, the processor 100 may compare the workloads of the pairs 1410 to 1460 of the array workloads. The processor 100 may enter the inner loop by comparing the elements of the array workloads between the pairs of the array workloads, and then compare the workloads of the neurons included in the array workloads, thereby determining whether to swap the neurons.

When it is determined to swap the neurons, the processor 100 may swap elements of a reorder LUT 1480.

Hereinafter, the operation of the outer loop and the operation of the inner loop will be described in detail through the example of FIG. 15.

The processor 100 may generate array workloads 1520 from state workloads 1510 in the manner described above. Hereinafter, for ease of description, workloads of neurons in the state workloads 1510 will be referred to as N0, N1, N2, N3, N4, N5, N6, and N7. In the example of FIG. 15, N0, N1, N2, N3, N4, N5, N6, and N7 may be 5, 2, 1, 6, 3, 3, 5, and 7, respectively.

The processor 100 may perform an outer loop to compare the workload elements of the array workloads 1520.

Hereinafter, the elements of the array workloads 1520 will be referred to as A0, A1, A2, and A3 from the left for description. That is, in the example of FIGS. 15, A0, A1, A2, and A3 may be 8, 5, 6, and 13, respectively.

The processor 100 may generate and compare a combination of the elements of the array workloads 1520 in descending order. First, the processor 100 may compare A3 and A0. In the first comparison, A3 may denote the source array workload, and A0 may denote the target array workload.

The processor 100 may compare A3 to the workload mean and compare A0 to the workload mean. Since A0 is "8", and the workload mean is "8", the processor 100 may continue to perform the outer loop without swapping.

In Step i1, the processor 100 may set A3 as the source array workload and A2 as the target array workload and compare A3 and A2. Since A3 is "13" which is greater than the workload mean "8", and A2 is "6" which is less than the workload mean "8", the processor 100 may perform the inner loop.

In the example of FIG. 15, neurons N3 and N7 may be assigned to the array A3, and neurons N2 and N6 may be assigned to the array A2.

In Step i1, j0, the processor 100 may determine N3 as a source neuron and N2 as a target neuron, thereby performing a comparison. Since N3 is "6", and N2 is "1", the processor 100 may swap N3 and N2. Then, A3 is changed to "8" which is less than or equal to the workload mean "8", and A2 is changed to "11" which is greater than the workload mean. Thus, the processor 100 may break the inner loop. The processor 100 may apply the swapped neurons to a LUT 1530.

In this example, after the swapping, elements N0, N1, N2, N3, N4, N5, N6, and N7 of state workloads 1540 may be 5, 2, 6, 1, 3, 3, 5, and 7, respectively. Further, elements A0, A1, A2, and A3 of array workloads 1550 after the swapping may be 8, 5, 11, and 8, respectively.

In Step i2, the source array workload may be A3, and the target array workload may be A1. Since A3 is now "8" which is equal to the workload mean, and A1 is "5" which is less than the workload mean, the processor 100 may continue to perform the loop without swapping.

In Step i3, the processor 100 may set A0 as the source array workload and A2 as the target array workload and compare A0 and A2. Since A0 is "8" which is equal to the workload mean, and A2 is "11" which is greater than the workload mean, the processor 100 may continue to perform the loop without swapping.

In Step i4, the processor 100 may set A0 as the source array workload and A1 as the target array workload and compare A0 and A1. Since A0 is "8" which is equal to the workload mean, and A1 is "5" which is less than the workload mean, the processor 100 may continue to perform the loop without swapping.

In Step i5, the processor 100 may set A2 as the source array workload and A1 as the target array workload and compare A2 and A1. Since A2 is "11" which is greater than the workload mean, and A1 is "5" which is less than the workload mean, the processor 100 may perform the inner loop.

In Step i5, j0, N2 and N6 may be assigned to the array A2, and N1 and N5 may be assigned to the array A1. The processor 100 may compare N6 and N1. Since N6 is "5", N1 is "2", the processor 100 may swap N6 and N1. Since after the swapping, A2 is changed to "8", and A1 is also changed to "8", the processor 100 may break the inner loop.

The processor 100 may apply the swapped neurons to a LUT 1560. After all the steps are terminated, all elements in array workloads 1580 of state workloads 1570 may be "8", as shown in FIG. 15. That is, the processor 100 may perform the inner loop and the outer loop in the manner described above and reorder the neurons (or columns of the matrix), thereby balancing the workloads of the arrays.

Figure 16:
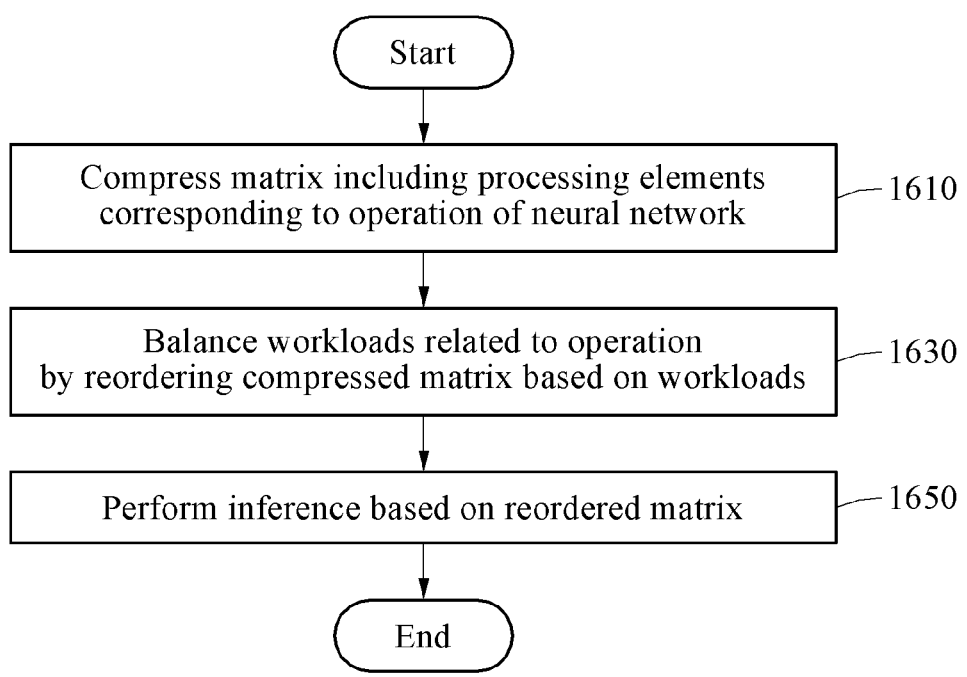
FIG. 16 illustrates an example of an operation of the neural network-based inference apparatus of FIG. 1.

FIG. 16 illustrates an example of an operation of the neural network-based inference apparatus of FIG. 1. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. One or more blocks of FIG. 16, and combinations of the blocks, can be implemented by special purpose hardware-based computer, such as a processor, that perform the specified functions, or combinations of special purpose hardware and computer instructions. In addition to the description of FIG. 16 below, the descriptions of FIGS. 1-15 are also applicable to FIG. 16, and are incorporated herein by reference. Thus, the above description may not be repeated here.

Referring to FIG. 16, in operation 1610, the processor 100 may compress a matrix including processing elements corresponding to an operation of a neural network.

The processor 100 may generate subcolumns by splitting the matrix including the processing elements. In an example, the processor 100 may generate a first subcolumn corresponding to a first processing element of the matrix including the processing elements, and generate a second subcolumn corresponding to a second processing element of the matrix including the processing elements.

The processor 100 may compress the matrix including the processing elements by pruning the elements of the subcolumns based on a target sparsity related to compression of the neural network.

The processor 100 may prune the elements of the subcolumns by replacing the elements of the subcolumns with a predetermined value such that a ratio of elements other than the predetermined value in the elements of the subcolumns is the target sparsity.

The processor 100 may prune the elements of the subcolumns by sequentially replacing the elements other than the predetermined value with the predetermined value, starting from an element whose absolute value is small. In an example, the predetermined value may be "0".

In operation 1630, the processor 100 may balance workloads related to the operation of the neural network by reordering the compressed matrix based on the workloads. The processor 100 may perform balancing to generate a reordered matrix.

The processor 100 may calculate workloads corresponding to neurons of the neural network. The processor 100 may calculate the workloads by accumulating the numbers of elements other than the predetermined value in the neurons of the neural network.

The processor 100 may assign the workloads corresponding to the neurons to the compressed matrix. The processor 100 may assign the workloads to columns of the compressed matrix.

The processor 100 may balance the workloads by reordering the compressed matrix based on the workloads assigned to the compressed matrix. The processor 100 may compare the workloads corresponding to the columns of the compressed matrix.

The processor 100 may perform balancing by swapping the columns of the matrix based on a result of the comparing.

The processor 100 may encode the reordered matrix based on components of the processing elements, positions of the processing elements, and a size of the reordered matrix.

In operation 1650, the processor 100 may perform inference based on the reordered matrix.

The neural network-based inference apparatus 10 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the neural network-based inference method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network-based inference method, comprising:
    compressing a matrix comprising processing elements corresponding to an operation of a neural network;
    balancing workloads related to the operation by reordering the compressed matrix based on the workloads; and
    performing inference based on the reordered matrix,
    wherein the compressing comprises:
       generating subcolumns by splitting the matrix; and
       compressing the matrix by pruning elements of the subcolumns based on a target sparsity related to compression of the neural network,
    wherein the compressing of the matrix by pruning elements of the subcolumns comprises replacing the elements of the subcolumns with a predetermined value such that a ratio of elements other than the predetermined value in the elements of the subcolumns is the target sparsity, and
    wherein the pruning of the elements of the subcolumns comprises pruning the elements of the subcolumns by sequentially replacing the elements other than the predetermined value with the predetermined value, starting from an element having a smallest absolute value.

2. The neural network-based inference method of claim 1, wherein the generating comprises:
    generating a first subcolumn corresponding to a first processing element of the matrix; and
    generating a second subcolumn corresponding to a second processing element of the matrix.

3. The neural network-based inference method of claim 1, wherein the balancing of the workloads related to the operation comprises:
    calculating the workloads corresponding to neurons of the neural network;
    assigning the workloads to the compressed matrix; and
    balancing the workloads by reordering the compressed matrix based on the workloads assigned to the compressed matrix.

4. The neural network-based inference method of claim 3, wherein the calculating of the workloads comprises calculating the workloads by accumulating a numbers of elements other than a predetermined value in the neurons of the neural network.

5. The neural network-based inference method of claim 3, wherein the assigning comprises assigning the workloads to columns of the compressed matrix.

6. The neural network-based inference method of claim 3, wherein the balancing comprises:
    comparing workloads corresponding to columns of the compressed matrix; and
    performing balancing by swapping the columns of the compressed matrix based on a result of the comparing.

7. The neural network-based inference method of claim 1, further comprising:
    encoding the reordered matrix based on any one or any combination of components of the processing elements, positions of the processing elements, and a size of the reordered matrix.

8. A non-transitory computer-readable storage medium storing instructions that, when executed by a processor, cause the processor to perform the neural network-based inference method of claim 1.

9. A neural network-based inference apparatus, comprising:
    a processor configured to compress a matrix comprising processing elements corresponding to an operation of a neural network, to balance workloads related to the operation by reordering the compressed matrix based on the workloads, and to perform inference based on the reordered matrix,
    wherein the processor is further configured:
       to generate subcolumns by splitting the matrix, and
       to compress the matrix by pruning elements of the subcolumns based on a target sparsity related to compression of the neural network,
    wherein the processor is further configured to prune the elements of the subcolumns by replacing the elements of the subcolumns with a predetermined value such that a ratio of elements other than the predetermined value in the elements of the subcolumns is the target sparsity,
    wherein the processor is further configured to prune the elements of the subcolumns by sequentially replacing the elements other than the predetermined value with the predetermined value, starting from an element having a smallest absolute value.

10. The neural network-based inference apparatus of claim 9, wherein the processor is further configured:
    to generate a first subcolumn corresponding to a first processing element of the matrix, and
    to generate a second subcolumn corresponding to a second processing element of the matrix.

11. The neural network-based inference apparatus of claim 9, wherein the processor is further configured:
    to calculate the workloads corresponding to neurons of the neural network,
    to assign the workloads to the compressed matrix, and
    to balance the workloads by reordering the compressed matrix based on the workloads assigned to the compressed matrix.

12. The neural network-based inference apparatus of claim 11, wherein the processor is further configured to calculate the workloads by accumulating numbers of elements other than a predetermined value in the neurons of the neural network.

13. The neural network-based inference apparatus of claim 11, wherein the processor is further configured to assign the workloads to columns of the compressed matrix.

14. The neural network-based inference apparatus of claim 11, wherein the processor is further configured:
    to compare workloads corresponding to columns of the compressed matrix, and
    to perform balancing by swapping the columns of the compressed matrix based on a result of the comparing.

15. The neural network-based inference apparatus of claim 9, wherein the processor is further configured to encode the reordered matrix based on any one or any combination of components of the processing elements, positions of the processing elements, and a size of the reordered matrix.

\* \* \* \* \*